United States Patent [19]

Medsker et al.

[11] Patent Number: 5,750,625

[45] Date of Patent: May 12, 1998

[54] PHENOLIC RESIN CURATIVES WHICH FORM NONSTAINING THERMOPLASTIC ELASTOMERS

[75] Inventors: Robert Eugene Medsker, Hartville; Raman Patel; Sabet-Abdou Sabet, both of Akron, all of Ohio

[73] Assignee: Advanced Elastomer Systems, L.P., Akron, Ohio

[21] Appl. No.: 871,264

[22] Filed: Jun. 9, 1997

[51] Int. Cl.$^6$ ............................... C08L 9/00; C08L 19/00; C08L 23/02

[52] U.S. Cl. ........................ 525/133; 525/141; 525/152

[58] Field of Search ............................... 525/133, 141, 525/152

[56] References Cited

U.S. PATENT DOCUMENTS 4,120,847  10/1978  Culbertson .
4,130,534  12/1978  Coran et al. .
4,311,628  1/1982   Abdou-Sabet et al. .
5,073,597  12/1991  Puydak et al. .

OTHER PUBLICATIONS

The Chemistry of Phenolic Resins by Robert W. Martin, Chapter 9, pp. 217–248 on Reactions of Phenol–Aldehyde Products. Published on or about Jan. 1, 1956 by John Wiley & Sons, New York, N.Y.

*Primary Examiner*—Patricia A. Short
*Attorney, Agent, or Firm*—Samuel B. Laferty; William A. Skinner

[57] ABSTRACT

The phenolic resin curatives used as a curative in thermoplastic elastomers are attributed with staining of painted surfaces which physically contact the thermoplastic elastomers. When the phenolic resin curatives are esterified (e.g., acetylated, tosylated, silylated or phosphorylated) before use as a curative, the amount of staining is reduced or staining is eliminated.

21 Claims, No Drawings

PHENOLIC RESIN CURATIVES WHICH FORM NONSTAINING THERMOPLASTIC ELASTOMERS

FIELD OF INVENTION

This invention relates to thermoplastic vulcanizates from crystalline polyolefins and an unsaturated rubber preferably EPDM, butyl rubber or combinations thereof which are cured with phenolic resin curatives. The phenolic resin curatives are esterified (e.g., acetylated, tosylated, phosphorylated, or silylated, etc.) before use and consequently result in thermoplastic elastomers which do not readily stain paint.

BACKGROUND OF THE INVENTION

Phenolic resin curatives for EPDM, butyl rubber or combinations thereof are known. The use of phenolic curatives in combinations with EPDM or butyl rubber in a thermoplastic vulcanizate is known.

Thermoplastic vulcanizates cured with conventional phenolic resins often stain painted surfaces when they come in contact with them. This has resulted in the exclusion of thermoplastic vulcanizates cured with phenolic resins in many applications where the elastomer will have extended contact with a painted surface such as structural moldings and glass to metal laminates.

SUMMARY OF INVENTION

Thermoplastic vulcanizates without a propensity to stain painted surfaces can be prepared from a crystalline polyolefin, an unsaturated rubber and a phenolic resin that has been esterified (e.g., acetylated, tosylated, silylated, or phosphorylated, etc.). These vulcanizates can be prepared by mixing and heating a crystalline polyolefin, an unsaturated rubber, and a phenolic resin curative, wherein a substantial portion of the hydroxyl groups of the phenolic resin have been esterified. The resulting thermoplastic vulcanizate desirably has from about 15 to about 75 parts by weight of crystalline polyolefin, from about 25 to about 85 parts by weight of unsaturated rubber and partially esterified fragments of the phenolic resin curative. The weights are based upon 100 parts by weight of crystalline polyolefin and unsaturated rubber. Acetylation is the preferred esterification process for the phenolic resin.

DETAILED DESCRIPTION

Traditional phenol formaldehyde curatives are characterized by formulas such as shown below:

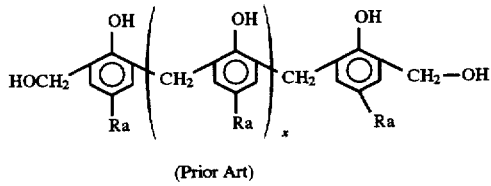

(Prior Art)

The phenolic resin can be esterified, (e.g., acetylated, tosylated, silylated or phosphorylated) resulting in a structure as shown below:

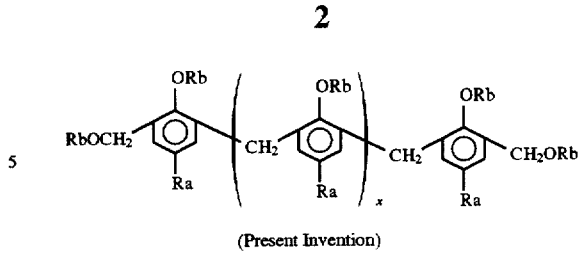

(Present Invention)

where x is an integer between 0 and 20 and Rb is the portion of a compound capable of esterification for example $CH_3$—CO, tosyl, etc. Examples of compounds which can esterify are acetyl chloride, acetic anhydride, p-toluenesulfonyl acid, hexamethyldisilazane and ortho-phosphoric acid. Although the structure shown is linear, the phenolic resin can be branched and the bridges between the aromatic rings need not be ortho to the pendant oxygen (e.g., they can be meta or para). For the purpose of this specification and the attached claims, esterification includes at least reactions between a carboxylic acid or anhydride thereof and an alcohol, a carbonyl halide and an alcohol, a sulfonic acid and an alcohol, a sulfonyl halide and an alcohol, a phosphorous acid (either in the acid form, acid halide form, or anhydride form) and an alcohol, and the reaction of a silylating agent with an alcohol. Dibenzyl ether bridges may also be present between the aromatic rings. Ra in the above formula is individually on each repeat unit a H atom or an alkyl of 1 to 12 carbon atoms.

The following references give additional information for preparing phenolic resins which are hereby incorporated by reference: G. Odian Chapter 2–12b4, "Principles of Polymerization", 2nd Edition, Wiley-Interscience, New York, 1981; I. H. Updegraff and T. J. Suen, "Condensations with Formaldehyde" Chapter 14 in "Polymerization Processes", C. E. Schildkneckt and I. Skeist, Wiley-Interscience, New York, 1977; M. F. Drumm and J. R. LeBlanc, "The Reactions of Formaldehyde with Phenols, Melamine, Analine, and Urea", Chapter 5 in "Step-Growth Polymerizations", D. H. Solomon, Ed., Marcel Dekker, New York, 1972; and R. W. Lenz, "Organic Chemistry of Synthetic High Polymers", Chaps. 4–8, Wiley-Interscience New York, 1967. Additional information is contained in "The Chemistry of Phenolic Resins" by Robert W. Martin published 1956 by John Wiley & Sons Inc., New York. In "The Chemistry of Phenolic Resins", which is hereby fully incorporated by reference, on page 277 the esterification of phenolic resins is discussed; on page 237 the esterification of phenolic resins is further discussed; on page 238 the blocking of phenolic hydroxyl groups by the alkylation with alkyl halides or dialkyl sulfate is attributed with improving color stability; on page 238 silylation of phenolic hydroxyl groups is discussed; and on page 230 the hydrolysis back to phenol alcohols is discussed. Phenolic resin curatives are also commercially available from a wide variety of sources.

The use of conventional phenolic resin curatives for crosslinking EPDM in a thermoplastic elastomer is disclosed in U.S. Pat. No. 4,311,628 hereby incorporated by reference for its teachings thereon. Those types of phenolic resin curatives (modified solely by acetylation, silylation, tosylation or phosphorylation) could be used in this invention. Phenolic curative systems comprising modified phenolic resins and a Lewis Acid catalyst such as a halogen donor and a metal compound are especially recommended. Modified phenol curatives containing 2–10 weight percent halogen, with bromine being a preferred halogen, do not require halogen donors.

The ordinary non-halogenated phenol curatives are more effective with a Lewis Acid catalyst such as a halogen donor.

When halogens are present on the curative or donor it is desirable to use at least one halogen halide scavenger such as metal oxides including iron oxide, titanium oxide, magnesium oxide, magnesium silicate, and silicon dioxide and preferably zinc oxide. Examples of halogen donors are stannous chloride; ferric chloride; and halogen donating polymers such as chlorinated paraffin, chlorinated polyethylene, chlorosulfonated polyethylene and polychlorobutadiene (neoprene rubber). Other Lewis Acid catalysts include sulfonic acid and salicylic acid.

The esterified (e.g., acetylated, tosylated, silylated, and phosphorylated) phenolic resin curatives are more resistant to forming staining compositions of matter. The activity of these modified phenolic curatives is indicative that the modification does not significantly detract from their effectiveness as a curative. The esterification reactions can be effective in converting at least 80, or at least 90 or more than 90% of the hydroxyl groups to other groups (both the hydroxyl of the phenol and the hydroxyl of methylol groups). Generally the above noted esters, especially the acetyl or tosyl groups do not block crosslinking reactions of the phenolic resin. Further since the modified phenolic resins after curing result in non-staining thermoplastic vulcanizate it is believed that some significant proportion of the hydroxyl groups of the phenolic resin curative are still esterified (e.g., acetylated, tosylated, silylated or phosphorylated) after the crosslinking reactions have occurred. One alternative explanation is that various esterifying agents (e.g. acetylating, tosylating, silylating, or phosphorylating) of the phenolic resin curatives blocks some side reactions that generate chemical species that promote staining by the thermoplastic vulcanizate.

The chemical agent for esterifying the phenolic resin can be any acid that can react with a hydroxyl group to form an ester. Examples include carboxylic acid, anhydrides of carboxylic acids or carboxylic acid chlorides having from 2 to 20 carbon atoms. Acetic anhydride, acetic acid, and acetic acid chloride are preferred carboxylic acid agents. Examples of sulfonic acids include alkyl or aryl or alkyl substituted aryl, or aryl substituted alkyl sulfonic acid. P-toluene sulfonic acid or the acid chloride is preferred. The silylating agents can be any silyl compound capable of reacting with the hydroxyl group of the phenol or methylol. These include silyl compounds having from 0 to 5 alkyl groups, preferably 1 to 3 alkyl groups; a leaving group such as a halogen attached to the silicon atoms like chlorine or such as an alkoxy group attached to the silicon atoms such as methoxy, ethoxy, propoxy etc; and one or more silicon atoms. Desirable silylating agents are hexamethyl disilazane and hexamethyl disiloxane. The phosphorylating agents can be various phosphorous acids/anhydride and halides. Said phosphorylating agents being reactive with the hydroxyl groups of phenolic resins by a process which phosphorylates the phenolic resin.

Desirably at least 70, more desirably at least 80 and preferably at least 90 mole % of the hydroxyl groups of the phenolic resin curatives are esterified. The actual mole % can be determined by NMR spectroscopy. The mole % of the phenolic hydroxyl groups esterified may vary from the mole % of methylol hydroxyl groups so functionalized. Desirably the ester chemical bond is rather labile at the cure temperature of the thermoplastic vulcanizate (e.g., from about 170° to about 250° C.) so the functionalization reaction does not retard the formation of the phenolic resin active intermediate required for crosslinking.

Typically the phenolic resin curative (also known as phenol resin curative) is used in amounts from about 2 to about 40 parts by weight per 100 parts by weight of rubber in the thermoplastic vulcanizate. More desirably the amount of phenolic curative is from about 3 to about 20 parts by weight per 100 parts by weight rubber. Appropriate amounts of cure activators such as halogen donors are desirably from about 0.01 parts by weight to about 10 parts by weight or more per 100 parts by weight of said rubber.

A major portion of polymers in the thermoplastic vulcanizate are the crystalline polyolefin and an unsaturated rubber desirably low in residual unsaturation. Examples of the crystalline polyolefin are polyethylene or polypropylene or their copolymers or mixtures thereof. Examples of the unsaturated rubber are EPDM or butyl rubber or combinations thereof. The unsaturated rubber may be a polyolefin such as EPDM which is not a crystalline polyolefin. Minor amounts of other polymers may be added to modify flow properties, as fillers or diluents, or as additives, such as polymeric antioxidants. Amounts of most of the components to the blend will be specified 1) per 100 parts by weight of the blend of the crystalline polyolefin and the unsaturated rubber or 2) per 100 parts by weight of the unsaturated rubber.

The crystalline polyolefin is desirably from about 15 to about 75 parts by weight, more desirably from about 25 to about 75 parts by weight, and preferably from about 25 to about 50 parts by weight per 100 parts of the blend of crystalline polyolefin and unsaturated rubber desirably low in residual unsaturation. The unsaturated rubber is desirably from about 25 to about 85 parts by weight, more desirably from about 25 to about 75 parts by weight and preferably from about 50 to about 75 parts by weight per 100 parts by weight of said blend.

If the amount of crystalline polyolefin is based on the amount of unsaturated rubber it is desirably from about 17.5 to about 300 parts by weight, more desirably from about 33 to about 300 parts and preferably from about 33 to about 200 parts by weight per 100 parts by weight of the unsaturated rubber.

The terms "blend", "thermoplastic elastomer", and "thermoplastic vulcanizate" used herein mean a mixture ranging from small particles of crosslinked rubber well dispersed in the thermoplastic elastomer matrix to co-continuous phases of the crystalline polyolefin and a partially to fully crosslinked rubber or combinations thereof. While thermoplastic elastomer can include block copolymers that need not be vulcanized, the term thermoplastic vulcanizate is limited to where the rubber phase is at least partially vulcanized (crosslinked).

The term "thermoplastic vulcanizate" refers to compositions that possess the properties of a thermoset elastomer and are reprocessable in thermoplastic equipment. Upon reaching temperatures above the softening points or melting point of the crystalline polyolefin phase they can form continuous sheets and/or molded articles with complete knitting or fusion of the thermoplastic vulcanizate under conventional molding or shaping conditions for thermoplastics.

Subsequent to full dynamic vulcanization (curing) of the rubber phase of the thermoplastic elastomer, desirably less than 3 wt. % and more desirably less than 1 wt. % of the unsaturated rubbers desirably low in residual unsaturation are extractable from the specimen of the thermoplastic vulcanizate in boiling xylene. Techniques for determining extractable rubber are set forth in U.S. Pat. No. 4,311,628 herein incorporated by reference.

The crystalline polyolefin comprises crystalline polymers from the polymerization of monoolefin monomers by a high pressure, low pressure process or intermediate pressure process; or by Ziegler Natta catalysts or by metallocene catalysts. Desirably the monoolefin monomers converted to repeat units are at least 95 wt. % monoolefins of the formula $CH_2=C(CH_3)$—R or $CH_2=CHR$ where R is a H or a linear or branched alkyl group of from 1 to 12 carbon atoms. Preferred crystalline polyolefins are polyethylene, polypropylene, or their copolymers, or mixtures thereof. The polyethylene can be high density, low density, linear low density, or very low density. The polypropylene can be homopolymer as well as a reactor copolymer polypropylene.

The unsaturated rubber can be any rubber having residual unsaturation that can react and be crosslinked with the phenolic resin under conventional crosslinking conditions. These rubbers can include natural rubber, EPDM rubber, butyl rubber, halobutyl rubber, nitrile rubber, or synthetic rubbers from at least one conjugated diene, or combinations thereof. Also included are rubbers comprising at least one alphaolefin, at least one vinyl or divinyl aromatic compound or a brominated polymer such as one from at least one alpha olefin and a para methyl styrene. EPDM, butyl and halobutyl rubbers are preferred rubbers low in residual unsaturation and are preferred when the vulcanizate needs good thermal stability or oxidative stability. For the purpose of this invention copolymers will be used to define polymers from two or more monomers and polymers can have repeat units from one or more different monomers.

The unsaturated rubber desirably low in residual unsaturation will desirably have less than 10 wt. % repeat units having nonconjugated unsaturation. For the purposes of determining the 10 wt. % repeat units having nonconjugated unsaturation, repeat units whose only unsaturation is conjugated i.e. an aromatic ring will not be included. Further acrylate rubber and epichlorohydrin rubber will desirably be excluded from the rubbers.

The unsaturated rubber desirably low in residual unsaturation is desirably an olefin rubber such as EPDM type rubber. EPDM type rubbers are generally terpolymers derived from the polymerization of at least two monoolefin monomers having from 2 to 10 carbon atoms, preferably 2 to 8 carbon atoms, and at least one polyunsaturated olefin having from 5 to 20 carbon atoms. Said monoolefins desirably have the formula $CH_2=CH$—R where R is a H or an alkyl of 1–12 carbon atoms and are preferably ethylene and propylene. Desirably the ethylene and propylene are present in the polymer in weight ratios of 5:95 to 95:5 (ethylene/propylene) and constitute from about 85 to about 99.6 wt. % of the polymer. The polyunsaturated olefin can be a straight chained, branched, cyclic, bridged ring, bicyclic, fused ring bicyclic compound etc. Examples of the polyunsaturated olefin include nonconjugated dienes such as 1,4-hexadiene, dicyclopentadiene, ethylidene norbornene, and vinyl norbornene. Preferably it is a nonconjugated diene. Desirably repeat units from the polyunsaturated olefin are from about 0.4 or 2 to about 10 or 15 wt. % of the rubber.

The unsaturated rubber desirably low in residual unsaturation can be a butyl rubber. Butyl rubber is defined a polymer predominantly comprised of repeat units from isobutylene but including a few repeat units of a monomer which provides sites for cross-linking. The monomers which provide sites for cross-linking can be a polyunsaturated olefin such as a conjugated diene or divinylbenzene. Desirably from about 90 to about 99.5 wt. % of the butyl rubber is repeat units derived from the polymerization of isobutylene and from about 0.5 to about 10 wt. % of the repeat units are from a polyunsaturated monomer having from 4 to 12 carbon atoms. Preferably the polyunsaturated monomer is isoprene or divinylbenzene. The polymer may be halogenated to further enhance reactivity in crosslinking. Preferably the halogen is present in amounts from about 0.1 to about 10 wt. %, more preferably about 0.5 to about 3.0 wt. % and preferably the halogen is chlorine or bromine.

Other rubber such as natural rubber or a synthetic rubber from at least one conjugated diene can be used in the dynamic vulcanizate. These rubbers are higher in unsaturation than EPDM rubber and butyl rubber. The natural rubber and synthetic rubber can optionally be partially hydrogenated to increase thermal and oxidative stability. The synthetic rubber can be nonpolar or polar depending on the comonomers. Desirably the synthetic rubber has at least repeat units from at least one conjugated diene monomer having from 4 to 8 carbon atoms. Comonomers may be used and include vinyl aromatic monomer(s) having from 8 to 12 carbon atoms and acrylonitrile or alkyl substituted acrylonitrile monomer(s) having from 3 to 8 carbon atoms. Other comonomers desirably used include repeat units from monomers having unsaturated carboxylic acids, unsaturated dicarboxylic acids, unsaturated anhydrides of dicarboxylic acids and other monomers having from 3 to 20 carbon atoms. Examples of synthetic rubbers include synthetic polyisoprene, polybutadiene rubber, styrenebutadiene rubber, butadiene-acrylonitrile rubber etc. Amine functionalized or epoxy functionalized synthetic rubbers may be used. Examples of these include amine or epoxy functionalized EPDM, and epoxy functionalized natural rubbers. These materials are commercially available.

The thermoplastic elastomers of this disclosure are generally prepared by melt mixing the crystalline polyolefin, the unsaturated rubber, and other ingredients (filler, plasticizer lubricant, stabilizer, etc.) in a mixer heated to above the melting temperature of the crystalline polyolefin. The optional fillers, plasticizers, additives etc. can be added at this stage or later. After sufficient molten-state mixing to form a well mixed blend, phenolic resin vulcanizing agents (also known as curatives or cross-linkers) are generally added. It is preferred to add the vulcanizing agent in solution with a liquid, for example rubber processing oil, which is compatible with the other components. It is convenient to follow the progress of vulcanization by monitoring mixing torque or mixing energy requirements during mixing. The mixing torque or mixing energy curve generally goes through a maximum after which mixing can be continued somewhat longer to improve the fabricability of the blend. If desired, one can add some of the ingredients after the dynamic vulcanization is complete. After discharge from the mixer, the blend containing vulcanized rubber and the crystalline polyolefin (thermoplastic) can be milled, chopped, extruded, pelletized, injection molded, or processed by any other desirable technique.

It is usually desirable to allow the fillers and a portion of any plasticizer to distribute themselves in the rubber or crystalline polyolefin phase before the rubber phase or phases are crosslinked. Crosslinking (vulcanization) of the rubber can occur in a few minutes or less depending on the mix temperature, shear rate, and activators present for the phenolic resin curative. Suitable curing temperatures include from about 120° C. for a crystalline polyethylene or 175° C. for a crystalline polypropylene phase to about 250° C., more preferred temperatures are from about 150° or 170° to about 200° or 225° C. The mixing equipment can include Banbury™ mixers, Brabender™ mixers and certain mixing extruders.

The thermoplastic elastomer can, as noted above, include a variety of additives. The additives include particulate fillers such as carbon black, silica, titanium dioxide, colored pigments, clay, zinc oxide, stearic acid, stabilizers, antidegradants, flame retardants, processing aids, adhesives, tackifiers, plasticizers, wax, discontinuous fibers (such as wood cellulose fibers) and extender oils. When extender oil is used, it can be present in amounts from about 5 to about 300 parts by weight per 100 parts by weight of crystalline polyolefin and unsaturated rubber. The amount of extender oil (e.g., hydrocarbon oils and ester plasticizers) may also be expressed as from about 30 to 250 parts, more desirably from about 70 to 200 parts by weight per 100 parts by weight of said unsaturated rubber. When non-black fillers are used it is desirable to include a coupling agent to compatibilize the interface between the non-black fillers and polymers. Desirable amounts of carbon black, when present, are from about 40 to about 250 parts by weight per 100 parts by weight of unsaturated rubber and from about 10 to about 100 parts by weight per 100 total parts by weight total of said unsaturated rubber and said extender oil.

Thermoplastic vulcanizate compositions of the invention are useful for making a variety of articles such as tires, hoses, belts, gaskets, moldings and molded parts. They are particularly useful for making articles by extrusion, injection molding and compression molding techniques. They also are useful for modifying thermoplastic resins, in particular, polyolefin resins. The compositions can be blended with thermoplastic resins using conventional mixing equipment making a rubber modified thermoplastic resin. The properties of the modified thermoplastic resin depend upon the amount of thermoplastic vulcanizate composition added.

The stress-strain properties of the compositions are determined in accordance with the test procedures set forth in ASTM D412. These properties include tension set (TS), ultimate tensile strength (UTS), 100% modulus (M100), and ultimate elongation at break (UE). The term "thermoplastic elastomer" or "elastomeric" as used herein and in the claims means a composition which possesses the tension set property of forcibly retracting within a given period of time (1 to 10 minutes) to less than 160% of its original length after being stretched at room temperature to twice its original length and held for the same period of time (1 to 10 minutes) before release. The test to determine if the thermoplastic elastomer stains paint is a paint stain test. Especially preferred compositions of the invention are rubbery compositions having tension set values of about 50% or less which compositions meet the definition for rubber as defined by ASTM Standards, V. 28, page 756 (D1566). More preferred compositions are rubbery compositions having a Shore D hardness of 60 or below or a 100% modulus of 180 kg/cm$^2$ or less or a Young's modulus below 2500 kg/cm$^2$.

EXAMPLES

The paint stain test evaluates the propensity of a thermoplastic vulcanizate to stain or discolor a painted surface. ASTM D925-88 was used as a reference to develop a method for thermoplastic vulcanizates.

Samples of the thermoplastic vulcanizate are placed between two painted wooden blocks (2×2×1" equivalent to 5.08×5.08×2.54 cm). The blocks have an acrylic primer coating and two acrylic finish coatings. The primer coating is a Zensser™ white pigmented water based primer that is dried 24 hrs at 70° C. in an oven. The primer is product #2004 of the Sherwin Williams Company in Cleveland, Ohio. The two finish coats are water based acrylic white paint color #40510 available from Adler in Switzerland. The first finish coat is dried 1 hour at 70° C. and the second coat is dried 24 hours at 70° C. in an oven. Other acrylic primers and paint could be used. It is preferred to use an acrylic paint with similar staining tendencies to the paint used in commercial products.

The thermoplastic vulcanizate is molded as a plaque (thickness 0.060"–0.120" or 1.52 mm–3.04 mm) and cut with a 1" (2.54 cm) diameter circular die into a test specimen.

The test is conducted by placing the thermoplastic vulcanizate test specimen (1" diameter) on top of one of the painted wooden blocks. The second painted wooden block is placed on top of the specimen. A 1 kg weight is placed on top of the upper wooden block. The entire assembly is placed in a preheated 70° C. circulating air oven for 24 hours. The assembly is taken apart and the two painted surfaces in contact with the specimen are examined visually for any staining. The criteria is no stain, very slight stain, stain or heavy stain. If the one hour test shows no stain the test can be continued for 7 days and 14 days evaluations at the 70° C. aging temperature. The test is an accelerated test as it tries to simulate longer contact periods at lower temperature.

Samples of acetylated phenolic resin were prepared to evaluate as curatives for non-staining thermoplastic vulcanization. A similar acetylation reaction is used to derivatize phenolic resin to facilitate differentiating methylol and dibenzylether structures in phenolic resin during $^1$H-NMR Spectroscopy.

Phenolic resin was ground into a fine powder with a mortar and pestle. Two mL of acetic anhydride was dissolved in 10 mL of dry pyridine and cooled with ice to 0° C. over 30 minutes. Then 0.5 g of the powdered phenolic resin was added with stirring and the mixture stirred until the phenolic resin dissolved. The mixture was placed back in the ice for 25 minutes and was allowed to stand for 48 hours at 23°±2° C. The mixture was then added slowly to a 10% (volume/volume) HCl/H$_2$O solution to precipitate the acetylated phenolic resin. The precipitate was filtered and dried for 24 hours. $^1$H-NMR analysis using a 200 MH$_z$ Varian XL NMR Spectrometer on the samples in deuterated acetone indicated acetylation was achieved for about 90 mole % of the hydroxyl groups. The reaction was repeated with several different phenol resin curatives.

Thermoplastic elastomers were prepared according to the formulations in Table 1 and their physical properties were evaluated to illustrate that three different acetylated phenolic curatives (in Examples A, B, and C) could provide non-staining elastomers from phenolic resin curatives. The controls and the examples were mixed according to the general mixing procedure in the specification.

TABLE I

| | Ctrl. 1 | Ctrl. 2 | Example A | Example B | Example C |
|---|---|---|---|---|---|
| EPDM Rubber | 100 | 100 | 100 | 100 | 100 |
| Polypropylene | 41 | 41 | 41 | 41 | 41 |
| Oil | 135 | 135 | 135 | 135 | 135 |
| Wax | 5 | 5 | 5 | 5 | 5 |
| Clay | 42 | 42 | 42 | 42 | 42 |
| ZnO | 2 | 2 | 2 | 2 | 2 |
| Acetylated Phenolic Resin | 0 | 0 | 6.3 | 6.3 | 6.3 |
| Phenolic Resin | 2.0 | 4.5 | 0 | 0 | 0 |
| SnCl2 | 1.26 | 1.26 | 1.26 | 1.26 | 1.26 |
| Physical Properties of Thermoplastic Vulcanizates | | | | | |
| Shore A | 61 | 63 | 61 | 61 | 61 |

TABLE I-continued

|  | Ctrl. 1 | Ctrl. 2 | Example A | Example B | Example C |
|---|---|---|---|---|---|
| UTS (MPa) | 4.2 | 6.5 | 6.47 | 6.69 | 6.74 |
| Ultimate % Elongation | 330 | 330 | 345 | 330 | 344 |
| 100% Modulus (MPa) | 2.1 | 2.7 | 2.88 | 2.89 | 2.86 |
| Tension Set % | 7.5 | 6.0 | 5 | 6 | 6 |
| Paint Stain | Yes | Yes | No | No | No |

All of recipe based upon 100 parts by weight rubber (pbw).

Table I compares the physical properties of thermoplastic vulcanizates cured with conventional phenolic resin (Control 1 and 2) with those cured with acetylated phenolic resins (Example A, B, and C). Because the estimated molecular weight of the acetylated phenolic resin was 931 while the estimated molecular weight of the conventional phenolic resin was 721, more acetylated phenolic resin was used (about 40 wt. % more than Control 2). The acetylated phenolic resins were analyzed to have from about 80 to about 98 mole % of their hydroxyl groups acetylated. Comparing Control 1 and Control 2 illustrates the degree of change in the physical properties that can be expected with variations in the amount of phenolic resin. The phenolic resin in Control 1 and 2 is SP1045 available from Schenectady International in Schenectady, N.Y. The phenolic resin in Examples A and B are acetylated SP1045. The phenolic resin in Example C was an acetylated phenolic resin having a higher percentage of dibenzyl ether linkages than in SP1045.

The Examples in Table I illustrate that the thermoplastic vulcanizates cured with acetylated phenolic resin (even when the phenolic resin is present in high amounts) do not stain painted surfaces in the paint stain tests. Further the thermoplastic vulcanizates have desirable high ultimate tensile strength (UTS), comparable ultimate % elongation, desirable higher 100% modulus, and desirable lower tension set than the controls.

While in accordance with the patent statutes the best mode and preferred embodiment has been set forth, the scope of the invention is not limited thereto, but rather by the scope of the attached claims.

What is claimed is:

1. A process for preparing a thermoplastic vulcanizate, comprising;
   a) heating a crystalline polyolefin to above its softening or melting temperature
   b) mixing an unsaturated rubber with said crystalline polyolefin and forming a blend thereof, and
   c) crosslinking said rubber with a phenolic resin curative wherein some of the hydroxyl groups of said phenolic resin curative have been esterified.

2. A process according to claim 1, wherein the hydroxyl groups are esterified with a carboxylic acid or anhydride thereof; a carbonyl halide; a sulfonic acid; a sulfonyl halide; or a phosphorous acid in acid, acid halide or anhydride form; or combinations thereof and wherein the esterified phenolic resins allows the thermoplastic vulcanizate cured therewith to be in contact with a acrylic paint coated surface for a period of time at least 7 days at 70° C. without causing a visibly detectable stain on said paint coated surface when viewed under normal daylight lighting.

3. A process according to claim 1, wherein said unsaturated rubber comprises ethylene-propylene diene rubber or a butyl rubber.

4. A process according to claim 3, wherein said unsaturated rubber includes a polymer from isobutylene and a polyunsaturated olefin having from 4 to 12 carbon atoms, optionally being halogenated.

5. A process according to claim 4, wherein at least 80 mole % of said hydroxyl groups are acetylated.

6. A process according to claim 5, wherein said crystalline polyolefin comprises polyethylene or polypropylene, or combinations thereof.

7. A process according to claim 1, wherein some of said hydroxyl groups of said curative are acetylated.

8. A process according to claim 7, wherein at least 80 mole % of said hydroxyl groups are acetylated.

9. A product made according to the process of claim 7.

10. A process according to claim 1, wherein said crystalline polyolefin comprises polyethylene or polypropylene, or combinations thereof.

11. A process according to claim 1, wherein said rubber comprises ethylene-propylene diene rubber and at least 80 mole percent of said hydroxyl groups are esterified.

12. A product made according to the process of claim 1.

13. A thermoplastic vulcanizate, comprising;
   a) from about 15 to about 75 parts by weight of a crystalline polyolefin and
   b) from about 25 to about 85 parts by weight of an unsaturated rubber cured by a phenolic resin, said phenolic resin being at least partially esterified.

14. A thermoplastic vulcanizate according to claim 13, wherein said crystalline polyolefin comprises polyethylene, or polypropylene, or combinations thereof.

15. A thermoplastic vulcanizate according to claim 13, wherein said unsaturated rubber comprises EPDM.

16. A thermoplastic vulcanizate according to claim 15, wherein at least 80 mole % of the hydroxyl groups of said phenolic resin fragments have been acetylated or tosylated.

17. A thermoplastic vulcanizate according to claim 13, wherein said unsaturated rubber consists essentially of a polymer derived from the polymerization of monomers including isobutylene and a polyunsaturated monomer having from 4 to 12 carbon atoms.

18. A thermoplastic vulcanizate according to claim 13, wherein said phenolic resin fragments are at least partially acetylated.

19. A thermoplastic vulcanizate according to claim 13, wherein said phenolic resin was esterified with a carboxylic acid or anhydride thereof; a carbonyl halide; a sulfonic acid; sulfonyl halide; a phosphorous acid in acid, acid halide or anhydride form; or combinations thereof.

20. A thermoplastic vulcanizate, comprising;
   a) from about 15 to about 75 parts by weight of a crystalline polyolefin,
   b) from about 25 to about 85 parts by weight of an unsaturated rubber, and
   c) phenolic resin portions from a phenolic resin curative said resin portions having at least a 70 mole % of their hydroxyl groups esterified.

21. A thermoplastic vulcanizate according to claim 20, wherein at least 85 mole % of the hydroxyl groups of the phenolic resin portions are acetylated.

* * * * *